(No Model.)

O. PIERCE.
FILTER.

No. 410,767. Patented Sept. 10, 1889.

Witnesses,
Geo. H. Strong.
J. H. Rourke.

Inventor,
Orestes Pierce
By Dewey & Co.
Atty

UNITED STATES PATENT OFFICE.

ORESTES PIERCE, OF SAN FRANCISCO, CALIFORNIA.

FILTER.

SPECIFICATION forming part of Letters Patent No. 410,767, dated September 10, 1889.

Application filed March 7, 1889. Serial No. 302,309. (No model.)

*To all whom it may concern:*

Be it known that I, ORESTES PIERCE, of the city and county of San Francisco, State of California, have invented an Improvement in Filters; and I hereby declare the following to be a full, clear, and exact description of the same.

My invention relates to an improved filter which is especially applicable for cleaning water in large quantities and under such conditions as are found necessary for public water-works or other bodies using large quantities of water; and it consists in the improved filter which I shall hereinafter fully describe and claim.

Figure 1:
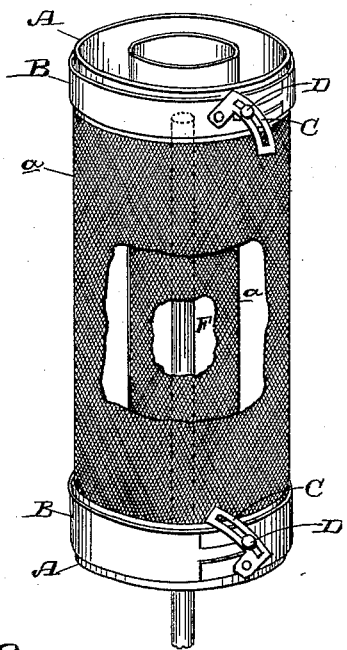
Figure 3:
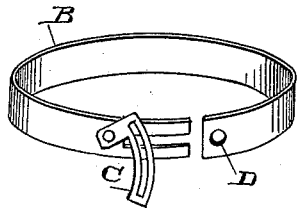
Figure 2:
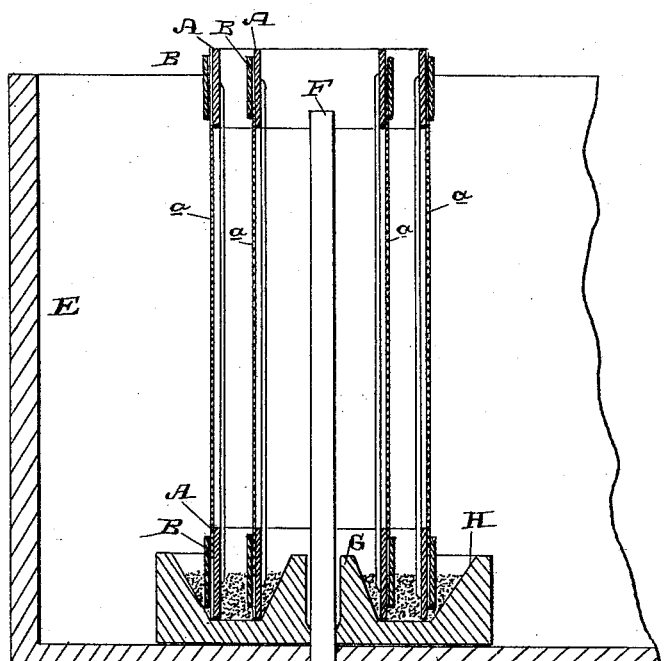

Figure 1 is a perspective view of my filter in one form with a part broken away, showing the interior construction. Fig. 2 is a sectional elevation. Fig. 3 is a detail showing the clamp for securing the filtering material to the frame.

Water which is supplied to cities in large quantities from reservoirs often contains much foreign matter held in suspension, which it is desirable to remove before the water is delivered into the distributing-pipes, and for this purpose screens of fine muslin may be employed, the water passing through them until the collection of foreign matter upon the surface necessitates their being taken out and cleaned. If the water is allowed to flow through them with any considerable current, the foreign matter becomes forced into the substance of the screen, so that it is difficult to clean it without a brush or other equivalent means.

In my invention I interpose a dam or check between the screens and the discharge of such a height as to produce nearly dead-water in the screen-chamber, and the inflow and outflow of the water will be so gentle as to prevent any rush or perceptible current against the screens. I am thus enabled to use many successive screens or thicknesses without clogging.

In the present case I have so arranged my filter as to provide a large filtering-surface, while occupying but a very small superficial area, and by the arrangement of the filters the water passes through them with the least possible current, so that the foreign matter may be easily washed from the surface whenever it has collected sufficiently to prevent a free passage of the water.

In making my filter, the unit is a single cylinder, the surface of which is covered with a filtering material. It will be manifest that as many of these cylinders may be set into a single tank or receptacle as may be desired, or each of them may be set in a separate vessel—as, for instance, a common cask.

The filter consists of two rings A A, separated from each other a sufficient distance. For convenience, these cylinders are of such a length as to receive the ordinary width of muslin, which is one yard, and the rings are connected together by suitable longitudinal bars, so as to retain them at the proper distance apart.

B B are rings which are fitted to surround the rings A, and they have a cam locking device C, one end of which is pivoted to one end of the ring B, and the other arm being curved and slotted, so that the pin D, which is fixed in the other end of the ring B, passes through the slot, and when the lever C is moved it will draw the ends of the ring B toward each other until the ring clamps firmly upon the inner ring A.

It will be manifest that when the muslin or material $a$ of the screen is rolled about the rings A A, extending from one to the other and being cut off to the proper length to surround the circumference of the same, and the rings B clamped upon the outside, the screen material will be very firmly held in place, and is at the same time easily removable.

In the present case I have shown two similarly-constructed concentric cylinders, one of which is placed within the other in the containing tank or vessel E, into which the water to be filtered is delivered by a pipe or any suitable means. Within this tank is a central pipe F, which passes through the bottom of the tank, into which it fits so tight, by any suitable joint, as to prevent leakage, and the upper end of this pipe, which is open, is sufficiently lower than the top of the screen and tank to allow the water, when it is filled to the proper height within the tank E, to flow into the top of the pipe and be discharged from the lower end. Around the bottom of this central pipe is fitted a cone G, having a diameter at the base equal to the interior diameter of the inner filtering-cylinder, so that when the latter is set down over it this cone will insure the cylinder standing in its proper position and concentric with the central discharge-pipe. A similar conical surface H surrounds the cone G and at such a distance that the outer cylinder A will be centered in a like manner by being set into it, this outer conical surface surrounding the inner one H in the form of a pan with inwardly-sloping sides, as shown. These cones may preferably be made as a single casting fixed to the bottom of the tank, and having a central hole, through which the pipe F passes and is properly packed. This construction enables me to place the filtering-cylinders in the proper position whenever they have been removed for the purpose of cleaning without any especial care, as the cones will guide them to their proper position. Sand is preferably placed in the basins or depressions formed between the cones, into which the edges of the filter-cylinders are embedded to make a tight joint.

Upon the lower end of the discharge-pipe F, after it has passed through the bottom of the tank, I arrange a spraying-nozzle, or I prefer at present what is known as the "Barker Centrifugal Mill," consisting of two arms I, having a hub which is fitted upon the bottom of the central pipe F, these arms having holes made in them to discharge water in opposite directions, which causes them to rotate slowly around the central pipe, and the water being discharged through the arms in comparatively small quantities will be sufficiently aerated as it falls into the receiver below. For this purpose the tanks E may be set as high above the receiver as may be found desirable.

The operation of the filter will then be as follows: The filter A being in place within the tank E, and the tank being filled with water to the proper height, which is above the tops of the pipes F, the water will flow from all sides through the filters A with a very gentle current, and, passing into the interior, will escape through the discharge-pipe F, as previously described. Whenever the filtering-surface becomes clogged by foreign matter, the filter is gently lifted out of the tank, and may be washed in any suitable manner and again returned to its place, very little time being lost in the operation. The two concentric filters enable me to lift either one out, while the other remains at work. Whenever the filtering-surface becomes so deteriorated that it will no longer serve its purpose, it is easily renewed by loosening the clamps, removing the outer rings B, and taking out the old and applying new filtering material, when it will be again ready for operation.

It will be manifest that flat screens could be employed in the comparatively dead or still water tank and the overflow and discharge take place at one end; but the cylindrical screens with numerous independent discharges produce greater screening capacity.

Having thus described my invention, what I claim as new, and desire to secure by Letters Patent, is—

An improved filter consisting of an outer tank, a casting or base-piece having an annular channel with oppositely-inclined walls forming approximately an inner and outer conical surface, vertical filtering-cylinders concentric with each other and removably filtered in said channel, and a discharge-pipe passing through the center of the base-piece and inner filtering-cylinder and discharging near the top of the latter, substantially as herein described.

In witness whereof I have hereunto set my hand.

ORESTES PIERCE.

Witnesses:
S. H. NOURSE,
H. C. LEE.